US007992592B2

(12) United States Patent
Lauterbach

(10) Patent No.: US 7,992,592 B2
(45) Date of Patent: Aug. 9, 2011

(54) SPRING-TENSIONED PISTON ACCUMULATOR WITH DETENT FUNCTION

(75) Inventor: Frank Lauterbach, Hochstadt (DE)

(73) Assignee: Rausch & Pausch GmbH, Selb (DE)

( * ) Notice: Subject to any disclaimer, the term of this patent is extended or adjusted under 35 U.S.C. 154(b) by 260 days.

(21) Appl. No.: 12/473,533

(22) Filed: May 28, 2009

(65) Prior Publication Data

US 2009/0293977 A1 Dec. 3, 2009

(30) Foreign Application Priority Data

May 30, 2008 (DE) ........................ 10 2008 026 124

(51) Int. Cl.
*F16L 55/04* (2006.01)
*B60T 8/36* (2006.01)

(52) U.S. Cl. ........... 138/31; 138/26; 138/30; 303/115.4; 303/119.2; 303/900

(58) Field of Classification Search .................... 138/31, 138/26, 30; 303/115.4, 119.2, 119.3, 900
See application file for complete search history.

(56) References Cited

U.S. PATENT DOCUMENTS

| | | | | |
|---|---|---|---|---|
| 4,201,522 | A * | 5/1980 | Toyota et al. | 417/311 |
| 4,387,677 | A * | 6/1983 | Guerrier | 123/179.7 |
| 4,877,187 | A * | 10/1989 | Daly | 239/89 |
| 5,388,899 | A * | 2/1995 | Volz et al. | 303/119.2 |
| 5,645,325 | A * | 7/1997 | Mueller et al. | 303/119.2 |
| 5,669,675 | A * | 9/1997 | Mueller et al. | 303/119.2 |
| 6,659,421 | B1 * | 12/2003 | Goossens | 251/129.02 |
| 2005/0173979 | A1 * | 8/2005 | Voss | 303/119.2 |

FOREIGN PATENT DOCUMENTS

| | | |
|---|---|---|
| DE | 102006014756 | 10/2007 |
| WO | 2007118500 | 10/2007 |

* cited by examiner

*Primary Examiner* — Patrick F Brinson
(74) *Attorney, Agent, or Firm* — Pepper Hamilton LLP

(57) ABSTRACT

A piston accumulator (10) comprises a pressure chamber (40) which on one side is closed by a piston (50) axially displaceable in a pipe (20) in order to change its volume depending on the axial position of the piston (50). A detent mechanism is provided in order to hold back the piston (50) against a spring preload (190) in a second position differing from a first position. The piston (50) is formed in a multi-part fashion and comprises at least a first piston part (52) and a second piston part (54), wherein at least one of the two piston parts (52) is hardened and disposed to cooperate with the detent mechanism in a catching fashion.

32 Claims, 3 Drawing Sheets

SPRING-TENSIONED PISTON ACCUMULATOR WITH DETENT FUNCTION

CROSS REFERENCE TO RELATED APPLICATIONS

This application claims priority to German Application No. 10 2008 026 124.6, filed May 30, 2008 which is incorporated herein by reference in its entirety.

The present invention relates to a spring-tensioned piston accumulator with detent function.

Such piston accumulators comprise a pressure chamber which on one side is closed by a piston which is axially displaceable between a first and a second position in order to change the volume of the pressure chamber depending on the axial position of the piston. The piston is pushed by means of spring preload into the first position which corresponds to an operating state of the piston accumulator in which the pressure chamber has a minimum volume. When during the operation of the piston accumulator for example a hydraulic fluid (or a pneumatic fluid) is supplied via a system connection of the piston accumulator to the pressure chamber, the volume of the pressure chamber is enlarged by the piston being displaced in the direction of the second position by the hydraulic pressure. A detent mechanism is provided in order to hold the piston in the second position against the spring preload so as to maintain the pressure stored in the piston accumulator by means of the fluid fed in. Releasing the detent mechanism finally releases the stored pressure. For holding the piston, here, the detent mechanism can be blocked in the second position by means of an electromagnet device or in a different manner.

In DE 10 2006 014 756 A1 a piston accumulator of the above-described type is disclosed which is used for storing the hydraulic fluid of a hydraulic system of a gearbox device of a vehicle. This piston accumulator here replaces an electromotively controllable auxiliary pump which usually supports a main gear pump driven by the internal combustion engine of the vehicle so as to permit a so-called start-stop function of the gearbox device by means of which the fuel consumption of the vehicle can be reduced.

But the piston accumulator described in DE 10 2006 014 756 A1 consists of numerous complex assemblies the production and mounting of which in each case requires a high effort in terms of manufacturing technology.

It is one object of the present invention to suggest a piston accumulator which can be cost-effectively produced with simplified assemblies and simpler manufacturing methods.

This object is achieved by a piston accumulator having the features of the independent claim. Advantageous embodiments and developments are specified in the dependent claims.

The spring-tensioned piston accumulator with detent function according to the invention comprises a pressure chamber which on one side is closed by a piston axially displaceable in a pipe in order to change the volume of the pressure chamber depending on the axial position of the piston. A spring preload of the piston accumulator pushes the piston into a first position. A detent mechanism is provided in order to hold back the piston in a second position differing from the first position against the spring preload. According to the invention the piston is formed in a multipart fashion and comprises at least a first piston part and a second piston part, at least one of the two piston parts being hardened and disposed to cooperate with the detent mechanism in a catching fashion. In this way a cost-effective production of the piston is supported, since only those parts of the piston which are exposed to a severe mechanical stress are formed in a hardened fashion, while other piston parts which are exposed to less mechanical stress can be produced of simple, unhardened and thus more cost-effective materials.

In a preferred embodiment the piston is sealed against the pipe by at least one ring seal inserted into a circumferential groove of the piston, the circumferential groove being formed not until the axial joining of the first piston part to the second piston part. This permits that seals with one-part, cost-effective seal elements, e.g. O-ring seals and/or sliding ring seals, can be used and the seal elements can be mounted free of strain on one of the two piston parts, before this is joined to the other piston part to form the piston—and the circumferential groove of the piston.

A simple mounting of the piston and in particular the circumferential groove for example can be effected by inserting the two piston parts into each other.

Preferably, the piston parts are formed as deep-drawn parts. Thus, permitting non-cutting manufacturing of the piston parts facilitates the production of the piston and reduces the accruing costs. Hardening the at least one piston part here can be effected after the deep drawing. Furthermore, one of the piston parts, for example the second piston part, can serve to define a stop position of the piston beyond the second position, in such a way that it cooperates with a stop when the piston is displaced beyond the second position. In order to perform this function the respective piston part does not necessarily have to be hardened, which, as mentioned, is a cost advantage.

The multi-part piston can further comprise a disk which firmly and sealingly is disposed in one of the two piston parts. This disk, besides sealing the pipe against the pressure chamber, serves as an actuating element for actuating the detent mechanism, for example in such a way that it cooperates with a below-described magnet armature of an electromagnet device of the piston accumulator when the piston is displaced in the direction of its second position and causes a displacement of the same. The electromagnet device here is adapted to block the detent mechanism in the second position of the piston, the detent mechanism being coupled with the magnet armature.

In particular, the disk can be disposed in the piston part in such a way that it is axially alignable in relation to the detent mechanism or to the magnet armature during the mounting of the piston accumulator. This way, it can be ensured with simple technical means that the magnet armature is not displaced too far when the piston is displaced in the direction of the second position and thereby damages other assemblies, for example components of the electromagnet device. Complicated and technically elaborate tolerance compensation mechanisms for the magnet armature are dispensable.

As a further boundary on one side of the pressure chamber and as a system connection for supplying a pressure producing fluid there can be provided a connecting flange which is inserted into the pipe of the piston accumulator. The connecting flange can be fixed to the pipe in a simple and cost-effective manner by rolling the pipe into a groove of the connecting flange. Other connecting techniques, however, can also be used, the form of the system connection being variable. The connecting flange preferably is produced of a plastic material. This facilitates e.g. a flow-optimized formation of fluid guiding channels. The pipe of the piston accumulator can also be manufactured of plastic.

The piston accumulator may comprise a pot, which is inserted into the pipe of the piston accumulator, in which the piston is axially displaceable. The pot accommodates at least a part of the electromagnet device. Preferably, the pot is formed and adapted such that a wall of the pot forms a part of the magnetic circuit of the electromagnet device. The magnetic circuit can be completed, for example, by a pole part of the electromagnet device, the magnet armature, and parts of an armature pipe in which the magnet armature is displaceably guided and which likewise can be disposed in the pot. Separate components which usually are provided specifically for producing a respective magnetic circuit become dispensable, as a result of which the structure and the mounting of the piston accumulator is facilitated, with the result that the costs are reduced.

Preferably, the pot is formed in a multifunctional fashion and for example at the same time provides a stop for the piston when this is displaced in the direction of its second position. In addition, the pot can serve as a guiding for a coil spring producing the spring preload, by the pot suitably extending into the pipe of the piston accumulator. Both features reduce the number of required components and keep the structure of the piston accumulator simple.

Finally, the pot is disposed in the pipe preferably directly adjacent to the pipe, the armature pipe guiding the magnet armature preferably being disposed straight in the pot. In this way the magnet armature is optimally centered in the pipe and aligned to the piston so as to ensure a perfect functioning of the detent mechanism.

Preferably, the pot is formed as a deep-drawn part, i.e. it can be produced in a simple and cost-effective manner.

Even an assembly of the electromagnet device which comprises a coil body with wire-wound coil, the pole part connected with the coil body, and a socket connected with the pole part for a plug for supplying the coil with electric power, can be disposed in the pot, preferably by simple pressing-in. This ensures, besides a cost-effective mounting, a vibration-free arrangement of the assembly.

The components of the above-mentioned assembly are formed such that they can be assembled already before winding the coil onto the coil body. For example, the socket can be injected to the pole part and the pole part can be connected with the coil body by means of a clip connection or the like. Alternative connecting techniques can be used. In this way it is possible to connect the two wire ends of the coil directly to contact terminals of the socket. A conventional contacting of the wire ends with terminals of the coil body, which in turn in a further production step are subsequently connected with the contact terminals of the socket, can be omitted due to the mounting of the components of the assembly being effected before the winding of the coil.

As already mentioned, the electromagnet device preferably comprises a magnet armature. When the piston is axially displaced from the first into the second position this magnet armature in turn is displaced into an axial position, in which by means of the magnet armature at least one blocking element of the detent mechanism is held in a radial position such that a displacement of the piston back into the direction of its first position is blocked. Preferably, for holding the at least one blocking element at least one separate latch piece is provided, which is fixed to the magnet armature and is produced of a harder material than the magnet armature.

This permits a latch piece to be provided in a simple fashion with a hardness necessary for its function, without the necessity to completely or at least partially harden the magnet armature which preferably is produced of a soft-magnetic material. Complete hardening would result in an impairment of the magnetic properties of the magnet armature, and at least partial hardening in the area of the latch piece by case-hardening would be technically elaborate and thus expensive. The magnet armature with its simple and cost-effective structure fulfills both features, namely a good magnetizability of the magnet armature and a latch piece, with a hardness sufficient for actuating blocking elements, which is firmly connected with the magnet armature.

In a preferred embodiment the latch piece is pressed onto the magnet armature. Other ways of fixing the latch piece to the magnet armature are also possible.

Preferably, the latch piece is formed as a ball ramp and the blocking element as a ball. In this way a very simply structured and reliably functioning detent mechanism can be realized which does not require any further components and therefore can be cost-effectively produced and mounted. Other forms of latch pieces and/or blocking elements can be used, here the number of employed latch pieces and/or blocking elements can vary. For example, a latch piece can radially displace a plurality of blocking elements or a plurality of blocking elements can be actuated by a plurality of latch pieces.

A preferably annular area integrally formed with the pole part, which is manufactured of the same material as the pole part, can be disposed at a side face of a pole part of the electromagnet device of the piston accumulator facing the magnet armature. This area replaces a small remanence plate usually used which prevents that the magnet armature remains adhered in an adhering position at the pole part, even when the power supply to the coil of the electromagnet device, which in the energized state effects a holding of the magnet armature, was cut off. The desired effect of the area results from the geometry of such area. For example, by means of this area a component of the piston accumulator can be omitted, which facilitates the mounting of the piston accumulator. Alternatively, such an area can be disposed at a side face of the magnet armature facing the pole part. Then this area, respectively, is manufactured of the same material as the magnet armature.

Preferably, the area replacing the small remanence plate is produced at the pole part (or the magnet armature) by means of extrusion or sintering, as a result of which a cost-effective production is permitted. Other suitable manufacturing techniques can also be used.

Such area has a thickness of approximately 0.05 to 0.1 millimeter, preferably a thickness of approximately 0.08 millimeter, and takes up a portion of between 5% and 20%, preferably between 10% and 15%, of the respective side face. As already mentioned, normally, the area is formed in an annual fashion, however, other forms, even disconnected forms, are possible.

In a preferred embodiment the end of the magnet armature facing away from the piston and towards the pole part has a reduced cross section. Advantageously, this reduced cross section is formed as a diameter leap from a large to a, in contrast to this, reduced outside diameter, but can also have a different design. This permits to increase the magnetic flux density in the adhering position of the magnet armature at the pole part and to increase the adherence without having to employ more energy for this.

In the following the present invention is described in more detail by way of example with reference to the accompanying Figures.

Figure 1:
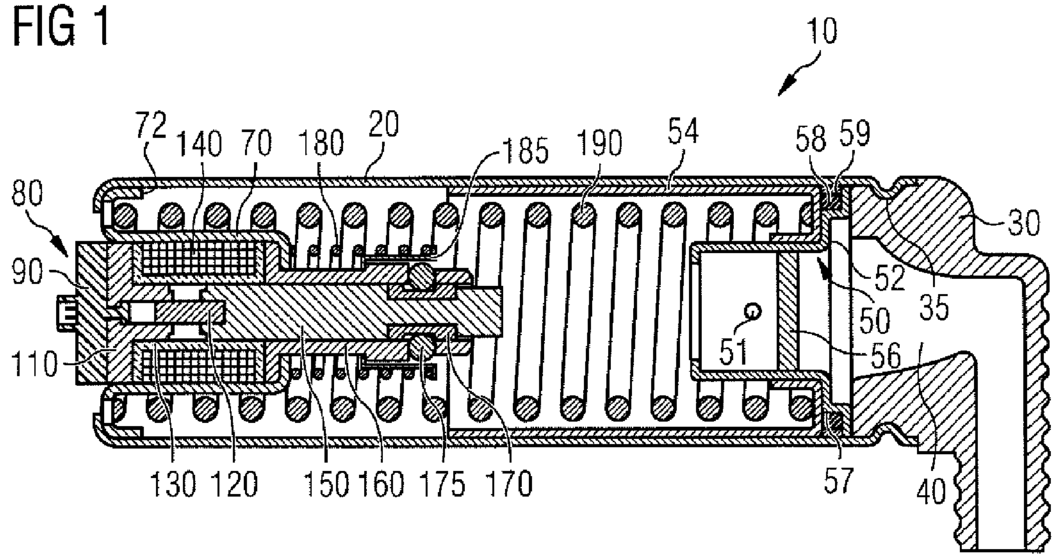
FIG. 1 shows a sectional view of a preferred embodiment of a piston accumulator according to the invention.

With reference to FIG. 1 a piston accumulator 10 comprises a pressure chamber 40 which on one side is closed by a piston 50. Piston 50, which in the following is described in more detail with reference to FIG. 4, is axially displaceable in a pipe 20 of the piston accumulator 10 between a first position (as shown in FIG. 1.) and a second position in order to change the volume of the pressure chamber 40 depending on the axial position of the piston 50. With the help of a hydraulic fluid (or pneumatic fluid) suppliable via a system connection, such as e.g. a connecting flange 30 shown in FIG. 1, piston 50 is displaced by means of fluid pressure against a spring preload in the direction of the second position. Here connecting flange 30 also limits pressure chamber 40 on one side, wherein portions of the pipe 20 will also absorb fluid pressure when the pressure chamber volume is increased. Here the spring preload is produced by a coil spring 190, but can also be provided in a different manner, e.g. pneumatically. Coil spring 190 is partially guided by a pot 70 which for its part is disposed in the pipe 20 at the side of the pipe 20 of the piston accumulator 10 which opposes the connecting flange 30 and partially accommodates an electromagnet device 80 of the piston accumulator 10 which for its part is described in more detail with reference to FIGS. 2 and 3A to 3C.

The basic mode of operation of the piston accumulator 10 is described briefly in the following. Electromagnet device 80 comprises a magnet armature 150 which is axially displaceable in an armature pipe 160 which is disposed in pot 70. When piston 50 is axially displaced from the first position into the second position due to fluid pressure, the magnet armature 150 for its part is axially displaced from its first position, shown in FIG. 1, when a disk 56 of the piston 50 meets the magnet armature 150 and carries it along. Furthermore, when piston 50 is axially displaced in the direction of the second position, before disk 56 meets magnet armature 150, cover sheets 185 are moved in the displacement direction of the piston 50 against a pretension produced by a spring 180, when portions of a piston part 52 of the piston 50 facing the magnet armature 150 cooperate with the cover sheets 185. Now, due to the displaced cover sheets 185 blocking elements 175 can be radially moved by means of a latch piece 170, which is fixed to the magnet armature 150, by recesses in the armature pipe 160 and held in a position which prevents a displacement of the piston 50 back into the direction of the first position. This is achieved by the magnet armature 150, which has been axially displaced by disk 56 of piston 50 in the direction of a pole part 110 of the electromagnet device 80, being held by means of electromagnetic force at pole part 110. A wire-wound coil 140 serves for this purpose which is wound on a coil body 130 and is supplied with electric power via a plug and socket connection 90. This means that a displacement of the magnet armature 150 back into the direction of its first axial position (shown in FIG. 1) is prevented. But this also means that a displacement of the piston 50 back into the direction of its first position is prevented, because although the piston part 52 could still be displaced over the—radially not yet displaced—blocking elements 175 when being displaced in the direction of the second position, it is now prevented from being displaced back by the same blocking elements—in their position radially changed and held by the latch piece 170 (firmly connected with the magnet armature 150). When coil 140 is no longer supplied with electric power, magnet armature 150 is released by electromagnet device 80 and magnet armature 150 is displaced due to a spring preload 155 (not shown in FIG. 1, cf FIG. 2) into its initial position shown in FIG. 1. Thus the latch piece 170 firmly connected with magnet armature 150 is also axially displaced in the same way, as a result of which the blocking elements 175 can radially fall back into their initial positions and release piston part 52 of piston 50. Thereupon, piston 50 releases the pressure stored by means of coil spring 190 via the fluid stored in pressure chamber 40.

Figure 2:
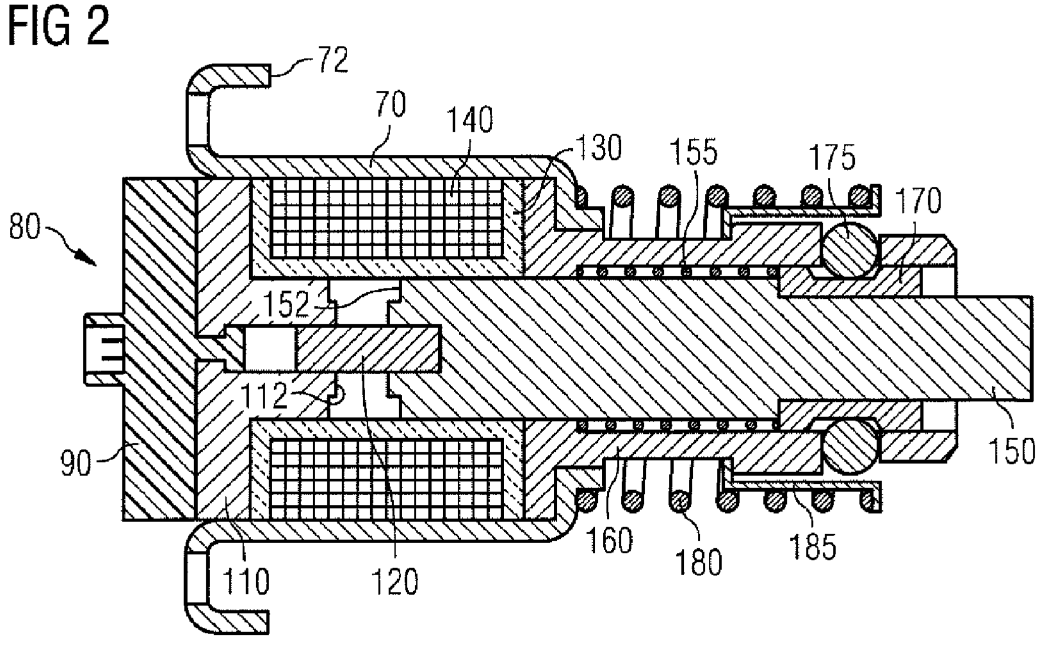
FIG. 2 shows an enlarged representation of individual cooperating assemblies of the piston accumulator of FIG. 1 likewise as a sectional view.

In FIG. 2 the detent mechanism, consisting of latch piece 170 and blocking elements 175, as well as surrounding and adjacent components of the electromagnet device 80 are shown in an enlarged fashion. The number of latch pieces 170 and blocking elements 175 can vary, even only one latch piece 170 (as in FIG. 2) and/or one blocking element 175 can be used. Latch piece 170 is fixed to magnet armature 150 as a separate component and manufactured from a harder material than magnet armature 150 which for its part is manufactured from a soft-magnetic material. In the embodiment shown in FIG. 2 latch piece 170 is pressed onto magnet armature 150 and is formed as a ball ramp which is adapted to radially displace the blocking elements 175 in the form of balls.

Figure 3A:
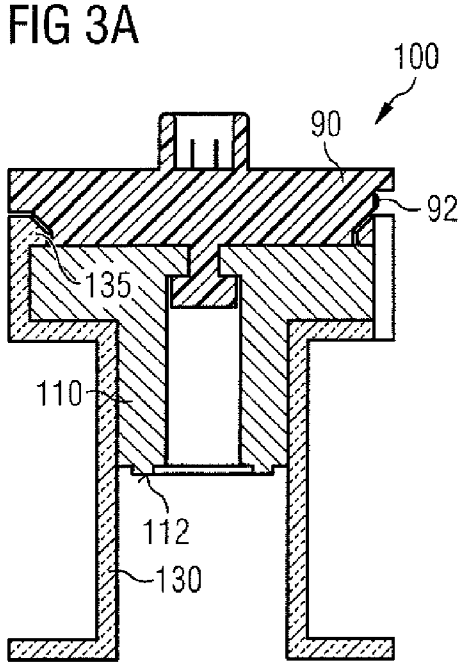
FIGS. 3A and 3B show sectional views of an assembly of an electromagnet device of the piston accumulator of FIG. 1, without wire-wound coil (FIG. 3A) and with wire-wound coil with wire ends directly contacted to connecting contacts of a plug socket (FIG. 3B)
Figure 3B:
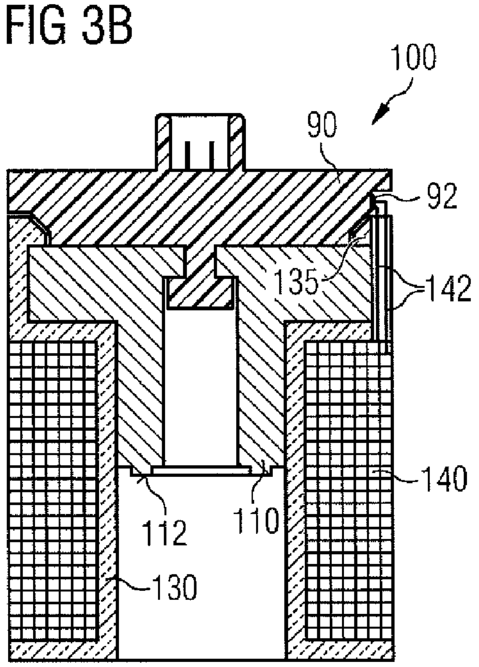
Figure 4:
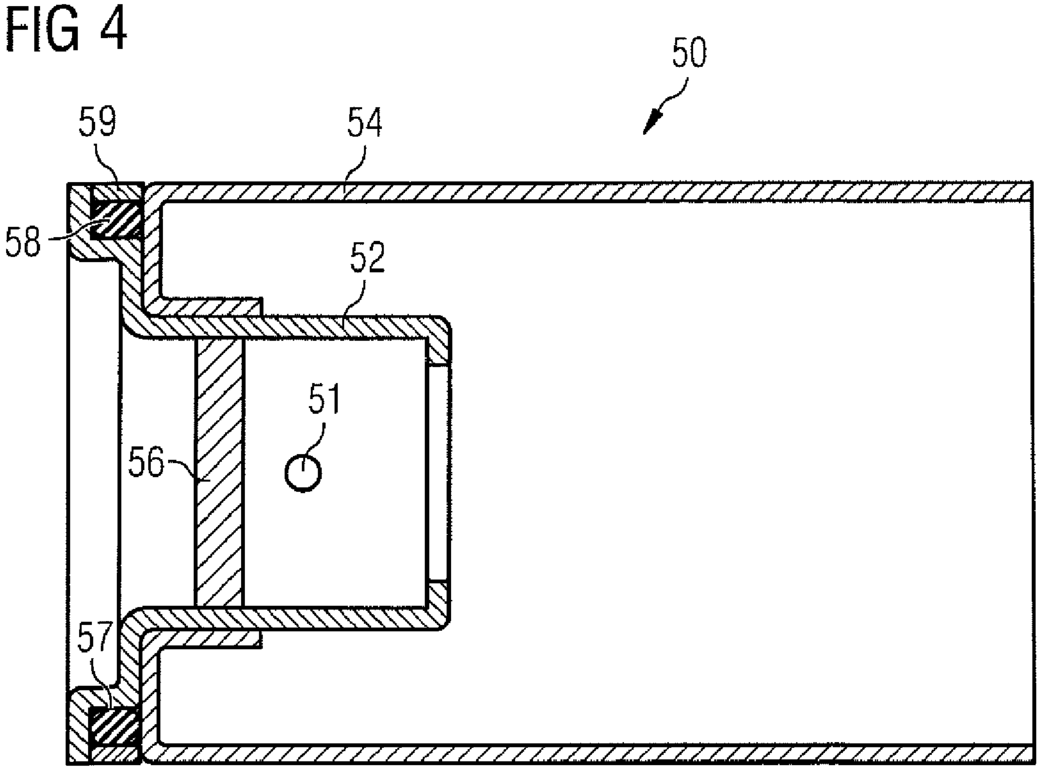
FIG. 4 shows an enlarged sectional view of a multi-part piston of the piston accumulator of FIG. 1.

At the side face of the pole part 110 facing the magnet armature 150 there is disposed a preferably annular area 112 integrally formed with pole part 110, such area being manufactured of the same material as pole part 110 (also cf FIGS. 3A, 3B). This area 112, which analogously, additionally or alternatively, can be disposed at the side face of the magnet armature 150 facing the pole part 110 and then, respectively, is manufactured from the same material as the magnet armature 150, assumes the role of a usually employed small remanence plate which is to prevent that the magnet armature 150 in the adhering position remains adhered to pole part 110, when the power supply to coil 140 no longer is maintained. The desired effect of the area 112, i.e. to prevent that the magnet armature "continues to adhere" to the pole part, here, results from the geometry of the area 112. In the shown embodiment area 112 is formed by means of sintering. Other manufacturing techniques, such as e.g. extrusion, can also be used. The area has a thickness of 0.05 to 1 millimeter, preferably a thickness of approximately 0.08 millimeter, and takes up a portion of between approximately 5% to 20%, preferably between 10% and 15%, of the respective side face of the pole part or of the magnet armature.

For increasing the magnetic flux density of the electromagnetic field generated by coil 140 in the adhering position of the magnet armature 150 at the pole part 110, the side of the magnet armature 150 facing away from piston 50 has a reduced cross section 152, which in the embodiment shown in FIG. 2 is based on a diameter leap from a large to a, in contrast to this, smaller outside diameter.

Figure 3C:
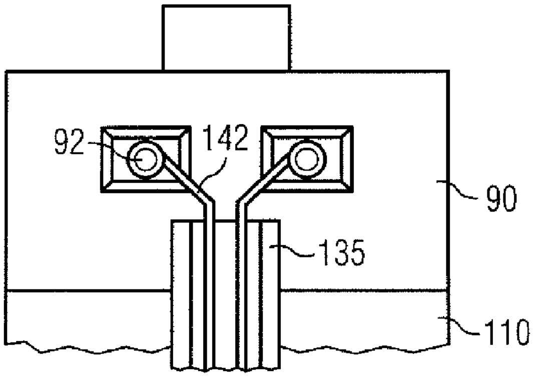
FIG. 3C shows a plan view of a detail of the assembly of FIG. 3B, which represents the contacting of the wire ends of the coil with the respective connecting contacts.

Pot 70 is manufactured from a magnetically conductive material as a deep-drawn part. Other manufacturing techniques are possible. A wall of the pot 70 forms a part of the magnetic circuit of the electromagnet device 80. The magnetic circuit here extends from the wall of the pot 70 via pole part 110, magnet armature 150, the part of the armature pipe 160 adjoining the coil body 130 back to the pot wall. As can be seen in FIG. 1, pot 70 further serves as a stop 72 for piston 50, more precisely for a piston part 54, when piston 50 is displaced beyond its second position. Since pot 70 directly adjoins the pipe 20 of the piston accumulator 10, and armature pipe 160 for its part is disposed directly in pot 70, and any further components favoring any tolerances are not used when mounting piston accumulator 10, the magnet armature 150 is optimally centered and aligned in relation to piston 50, as a result of which a proper functioning of the detent mechanism is ensured. An assembly 100 of the electromagnet device 80 in the following described in more detail with reference to FIGS. 3A, 3B and 3C is pressed into the pot 70 free of play arid therefore mounted in a vibration-free fashion.

As shown in FIG. 3A, assembly 100 comprises coil body 130 for carrying the wire-wound coil 140 (FIG. 3B), pole part 110 connected with the coil body 130 and socket 90 for the plug for supplying coil 140 with electric power. The components of the assembly 100, as can be seen in FIG. 3A, are already joined before winding the wire-wound coil 140. In the embodiment of FIG. 3A pole part 110 is clipped onto coil body 130 by means of a clip connection 135 of the coil body 130, while socket 90 is injection molded to pole part 110. But there can also be used other connecting techniques in order to join the respective components to form assembly 100.

Due to the structure of the assembly 100 the ends of the coil 142 can be connected directly with the contact terminals 92 of the plug socket 90 after the winding of the wire-wound coil 140. For this purpose in the described embodiment, as shown in FIG. 3B, the respective wire ends 142 are guided through a channel in an arm of the clip connection 135 of the coil body 130 from coil 140 past pole part 110 directly to contact terminals 92 and there, as outlined in FIG. 3C in plan view, suitably connected with contact terminals 92. The ends 142 of the coil wire can also be guided in a different fashion and on a different path to the contact terminals 92. Preferably, the prefabricated contacted terminals 92 and the wire ends 142 of the coil 140 guided thereto are covered with a cap or the like (not shown) to be put on and thus protected.

With reference to FIGS. 1 and 4 now the multi-part piston 50 is described in more detail, which in the shown embodiment is sealed against the pipe 20 of the piston accumulator 10 by seals 58, 59 which are inserted into a circumferential groove 57 of the piston 50. Alternative forms of sealing are possible. The circumferential groove 57 is not formed until the axial joining of the first piston part 52 to the second piston part 54. In the embodiment of the piston 50 shown in FIG. 4 the first and the second piston part 52, 54 are inserted into one another so as to thus form the circumferential groove 57 of the piston 50. In the circumferential groove 57 are disposed an O-ring seal 58 and a slide ring 59. Due to the structure of the piston 50 the two seals 58, 59 can already be moved onto the first piston part 52, before the second piston part 54, forming groove 57 together with piston part 52, is put onto the first piston part 52, i.e. seals 58, 59 can be formed in one piece and mounted easily and free of strain.

The first piston part 52 is hardened and disposed to cooperate, as described with reference to FIG. 1, with the detent mechanism in a catching fashion. The second piston part 54 does not necessarily have to be hardened, because when the piston 50 is displaced beyond the second position (cf FIG. 1), it only serves to define an end position of the piston 50 when it meets the stop 72 of the pot 70. Both piston parts are formed as deep-drawn parts, although other manufacturing methods are also possible. Before the hardening, a hole 51 is provided in the first piston part 52, e.g. punched, to permit that the air can escape via pipe 20 when piston 50 is displaced. There can also be provided a plurality of holes 51. They can also be formed as throttles in order to dampen the running of the piston 50 into its second position.

Disk 56 disposed firmly and sealingly in the first piston part 52 serves to displace, as described with reference to FIG. 1, the magnet armature 150, when piston 50 is displaced in the direction of the second position, by moving up against and carrying it along in the same direction and thus to indirectly actuate the detent mechanism. On mounting the piston accumulator 10, the disk 56 in the first piston part 52 can be axially aligned in relation to a position of the detent mechanism, in particular to the position of the magnet armature 150, in order to prevent damaging of the electromagnet device 80 when the magnet armature 150 possibly is axially displaced too far in the direction of the pole part 110. In this way an elaborate length adjustment mechanism (not shown) can be omitted in the magnet armature 150.

As to be seen in FIG. 1, the connecting flange 30 is fixed to the pipe 20 by simply rolling in the pipe 20 into a groove 35 of the connecting flange 30. Other connecting techniques can also be used. In the connecting flange 30 there can be additionally disposed in a suitable fashion damping elements and/or throttle valves (not shown) and the like in order to regulate the piston movement during the axial displacement and the (back) flow of the fluid.

In the shown embodiment connecting flange 30 is manufactured of plastic material, but other suitable materials can also be used. Pipe 20, too, can be manufactured from a suitable plastic material.

I claim:

1. A spring-tensioned piston accumulator having detent function, comprising:

- a pressure chamber which on one side is closed by a piston axially displaceable in a pipe for changing the volume of the pressure chamber depending on the axial position of the piston;
- a spring preload which pushes the piston into a first position; and
- a detent mechanism for holding back the piston in a second position different from the first position against the spring preload,
- wherein the piston is formed in a multi-part fashion and comprises at least a first piston part and a second piston part, wherein at least one of the two piston parts is hardened and is disposed to cooperate with the detent mechanism in a catching fashion.

2. The piston accumulator according to claim 1, wherein the piston is sealed against the pipe by at least one ring seal inserted into a circumferential groove of the piston, wherein the circumferential groove is formed not until the axial joining of the first piston part to the second piston part.

3. The piston accumulator according to claim 2, wherein the first piston part and the second piston part are adapted to be inserted into each other to form the circumferential groove.

4. The piston accumulator according to claim 1, wherein the first piston part and/or the second piston part are deep-drawn parts.

5. The piston accumulator according to claim 1, wherein one of the two piston parts is disposed to cooperate with a stop when the piston is displaced beyond the second position.

6. The piston accumulator according to claim 1, wherein the multi-part piston comprises a disk which is firmly and sealingly disposed in a piston part and serves as an actuating element for actuating the detent mechanism.

7. The piston accumulator according to claim 6, wherein during the mounting of the piston accumulator the disk is disposed in the piston part in such a way that it is axially alignable in relation to a position of the detent mechanism.

8. The piston accumulator according to claim 1, wherein as a one-side boundary of the pressure chamber a connecting flange is inserted in the pipe and is fixed to the pipe in that the pipe is rolled in a groove of the connecting flange.

9. The piston accumulator according to claim 8, wherein the connecting flange is formed of a plastic material.

10. The piston accumulator according to claim 1, further comprising:

an electromagnet device which is adapted to block the detent mechanism in the second position of the piston; and a pot which is inserted into the pipe and accommodates at least a part of the electromagnet device, wherein a wall of the pot is disposed to form a part of the magnetic circuit of the electromagnet device.

11. The piston accumulator according to claim 10, wherein the pot is mounted in the pipe such that it forms a stop for the piston.

12. The piston accumulator according to claim 10, wherein the pot extends within a coil spring producing a spring pre-load such that the pot serves as a guide for the coil spring.

13. The piston accumulator according to claim 10, wherein the pot is formed as a deep-drawn part.

14. The piston accumulator according to claim 10, wherein the pot directly adjoins the pipe.

15. The piston accumulator according to claim 10, wherein the electromagnet device at least partially is pressed into the pot.

16. The piston accumulator according to claim 1, further comprising:

an electromagnet device which is adapted to block the detent mechanism in the second position of the piston, the electromagnet device comprising:

an assembly with a coil body;

a wire-wound coil wound on the coil body;

a pole part connected with the coil body; and a socket for a plug for supplying the coil with electric power which is connected with the pole part, wherein the two ends of the wire-wound coil are directly connected to contact terminals of the socket.

17. The piston accumulator according to claim 10, wherein the electromagnet device comprises:

an assembly with a coil body;

a wire-wound coil wound on the coil body;

a pole part connected with the coil body; and a socket for a plug for supplying the coil with electric power which is connected with the pole part, wherein the two ends of the wire-wound coil are directly connected to contact terminals of the socket.

18. The piston accumulator according to claim 16 or 17, wherein the socket is injection molded to the pole part.

19. The piston accumulator according to claim 16 or 17, wherein the pole part is connected with the coil body by means of a clip connection.

20. The piston accumulator according to any of the claim 1, further comprising an electromagnet device with a magnet armature which on the axial displacement of the piston from the first into the second position in turn is displaced into an axial position in which by means of the magnet armature at least one blocking element of the detent mechanism is held in a radial position such that a displacement of the piston back into the direction of its first position is blocked, wherein for holding the at least one blocking element in the radial position at least one separate latch piece is provided which is fixed to the magnet armature and is made of a harder material than the magnet armature.

21. The piston accumulator according to any of the claim 10, wherein the electromagnet device comprises a magnet armature which on the axial displacement of the piston from the first into the second position in turn is displaced into an axial position in which by means of the magnet armature at least one blocking element of the detent mechanism is held in a radial position such that a displacement of the piston back into the direction of its first position is blocked, wherein for holding the at least one blocking element in the radial position at least one separate latch piece is provided, is fixed to the magnet armature and is made of a harder material than the magnet armature.

22. The piston accumulator according to claim 20, wherein the latch piece is pressed onto the magnet armature.

23. The piston accumulator according to claim 20, wherein the latch piece is formed as a ball ramp and the blocking element as a ball.

24. The piston accumulator according to claim 20, wherein at a side face of a pole part of the electromagnet device facing the magnet armature there is disposed an area integrally formed with the pole part and/or at a side face of the magnet armature facing the pole part there is disposed an area integrally formed with the magnet armature.

25. The piston accumulator according to claim 24, wherein the area is formed by means of sintering or extrusion.

26. The piston accumulator according to claim 24, wherein the area has a thickness of 0.05 to 0.1 millimeter.

27. The piston accumulator according to claim 24, wherein the area takes up between 5% and 20% of the respective side face.

28. The piston accumulator according to claim 20, wherein the end of the magnet armature facing away from the piston has a reduced cross section.

29. The piston accumulator according to claim 28, wherein the reduced cross section is formed as a diameter leap from a large to a, in contrast to this, smaller outside diameter.

30. The piston accumulator according to claim 21, wherein the latch piece is pressed onto the magnet armature.

31. The piston accumulator according to claim 21, wherein the latch piece is formed as a ball ramp and the blocking element as a ball.

32. The piston accumulator according to claim 21, wherein at a side face of a pole part of the electromagnet device facing the magnet armature there is disposed an area connected with the pole part in a bonding fashion and/or at a side face of the magnet armature facing the pole part there is disposed an area integrally formed with the magnet armature.

* * * * *